Patented Dec. 21, 1937

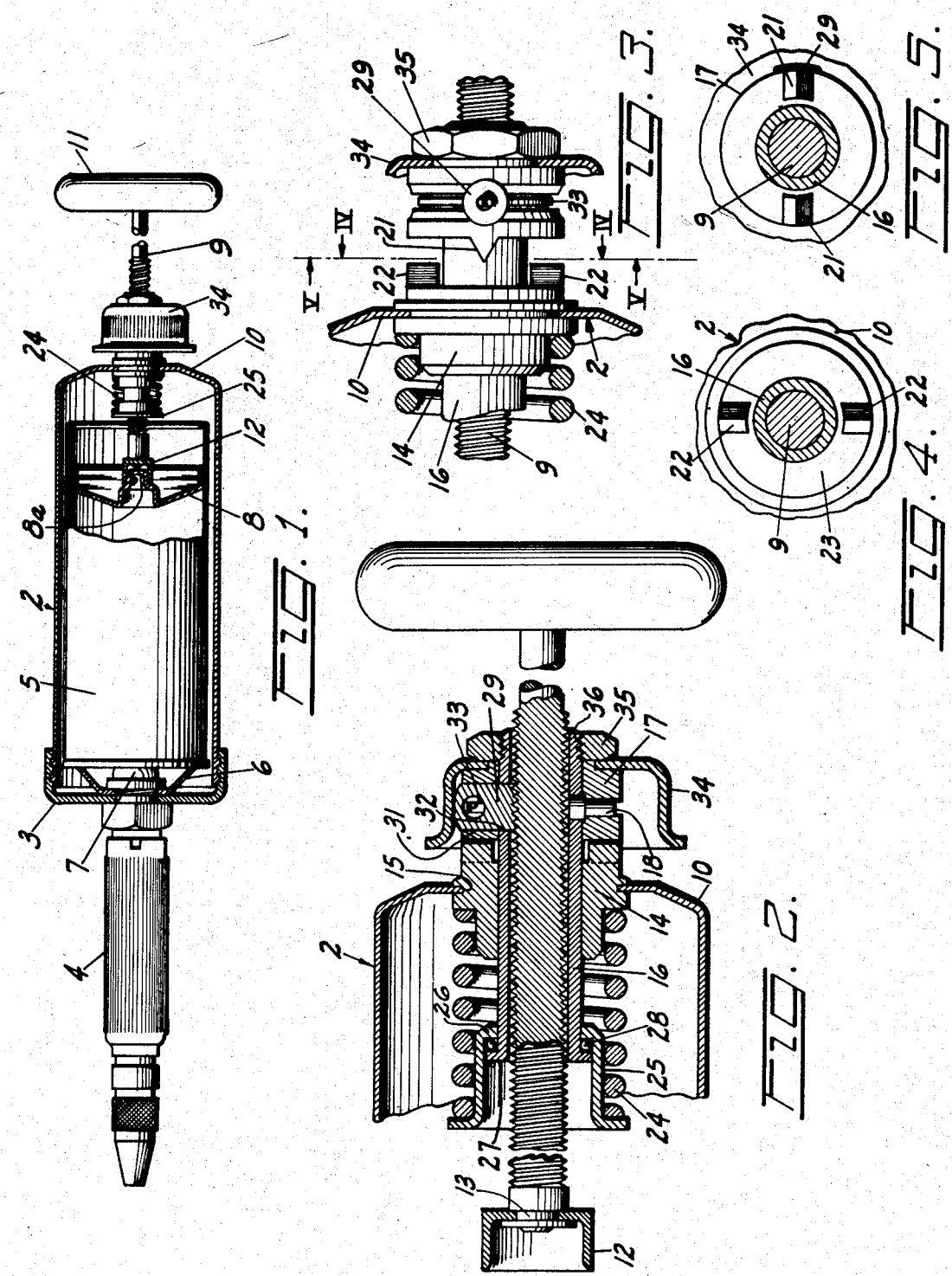

2,103,044

UNITED STATES PATENT OFFICE 2,103,044

LUBRICATING DEVICE

Harry R. Tear, Evanston, Ill., assignor to The Lubrication Corporation, South Bend, Ind., a corporation of Delaware Application November 30, 1934, Serial No. 755,255

13 Claims. (Cl. 221—47.4)

This invention relates to improvements in lubricating devices and more particularly to a safety feed screw mechanism for applying pressure to the lubricant in the low pressure cartridge or reservoir of a lubricant gun, dispenser or the like such, for instance, as that disclosed in my copending application Serial No. 753,663, filed Nov. 19, 1934.

With the introduction of cartridge-type lubricant guns and dispensing apparatus into the field of high pressure lubrication wherein cartridges are employed as a source of replaceable or interchangeable lubricant supply for the gun or dispenser, certain serious problems have been encountered in the use of manually-operated force-multiplying mechanism for applying pressure to the lubricant in the cartridge or container during the charging operation. In small hand guns it is most advantageous to employ a simple feed screw for applying thrust to the piston of the cartridge thereby to place the lubricant in the cartridge under charging pressure. Such feed screws, however, are capable of developing very high thrust and in the hands of an inexperienced operator sufficient pressure might be built up within the cartridge of the gun to cause the cartridge to burst.

In some types of equipment employing interchangeable cartridges, it is desirable to place the piston of the cartridge under an initial thrust approximating the maximum thrust desirable with respect to the strength of the cartridge walls through the medium of a compression spring so that as lubricant is discharged from the cartridge into the high pressure unit of the gun or dispenser, the lubricant in the cartridge is maintained under pressure which, of course, may gradually diminish as the spring is permitted to expand. Such a spring practically necessitates the use of high force-multiplying pressure-producing mechanism such as a feed screw in order to operate effectively and, consequently, an unskilled operator may apply unnecessary force sufficient to rupture or otherwise damage the cartridge.

It is, therefore, an object of my invention to provide a mechanism for applying pressure to the piston of a lubricant cartridge or container, of such character that it may be automatically rendered ineffective when the developed pressure attains a predetermined value and which may become effective again upon the reduction of pressure in the cartridge or container below the aforesaid predetermined value.

Another object is to provide pressure-producing mechanism for cartridge or container pistons as described which includes as an operative component thereof, means for storing power or energy for urging the piston along its course of travel and which is operative subsequent to the application of force thereto.

Other objects, the advantages, and uses will become apparent after reading the following description and claims and after consideration of the accompanying drawing wherein:

Fig. 1 is a side elevation, partially in section, of a hand lubricant gun constructed in accordance with the invention;

Fig. 2 is a fragmentary sectional view of the safety feed screw mechanism as it appears during normal operation;

Fig. 3 is a view similar to Fig. 2 of the feed screw mechanism as it appears when the pressure in the cartridge exceeds a predetermined value;

Fig. 4 is a sectional view along the line IV—IV of Fig. 3; and

Fig. 5 is a sectional view along the line V—V of Fig. 3.

I have illustrated my improved feed screw mechanism as embodied in a hand type cartridge lubricant gun comprising a barrel 2 having a detachable cap 3 at one end upon which a "push-type" high pressure lubricant pump unit 4 is mounted in axial alignment with the longitudinal axis of the barrel 2. Lubricant for the pump unit 4 may be supplied through the medium of interchangeable lubricant cartridges, one of which is illustrated at 5, and which during operation of the gun is located within the barrel 2 and supported upon the gun as by a cartridge connector plate 6 carried by the cap and pump assembly. A cartridge connector stud 7 representing the inlet for the pump unit 4 is connected with the outlet opening (not shown) of the cartridge 5 when the cartridge is supported upon the connector plate 6 as illustrated. A piston 8 slidably mounted within the cartridge 5 provides a means for placing the lubricant in the cartridge under pressure by the application of thrust thereto along the longitudinal axis of the piston as by the hand operated feed screw 9 extending through the rearward end 10 of the barrel 2.

With reference to Figs. 2 and 3 the feed screw 9 may be provided with a hand grip 11 at its rearward end and a cup 12 upon its forward end mounted thereupon as by a swivel connection 13. The cup 12, in the mechanism illustrated is fashioned for engagement with a central and projecting portion 8a on the rear face of the piston 8 as shown in Fig. 1.

The mounting for the feed screw 9 may comprise a metal bushing 14 fixed in a central opening 15 through the end wall 10 of the barrel through which a sleeve 16 is slidably and rotatably mounted. An annular member 17 may be fixed upon the rearward end of the sleeve 16, exteriorly of the barrel 2, as by means of a plug or key 18 disposed in aligned bores in the sleeve 16 and member 17 located upon an axis perpendicular to the axis of the sleeve. The forward face 19 of the member 17 (see Fig. 5) may be provided with a pair of spaced apart lugs 21 located on opposite sides of the sleeve 16. Similar lugs 22 may be formed upon opposite sides of the sleeve 16 upon the opposed face 23 on the bushing 14. The lugs 21 and 22 may have substantially triangular cross-sectional contour as indicated at Fig. 3 and are normally located in a common plane so that the rotation of the member 17 relative to the bushing 14 and hence the barrel 2 is precluded by lateral abutment of the pairs of lugs against one another. A compression spring 24 may be disposed between the bushing 14 and a flanged sleeve 25 slidably mounted upon the outer wall of the sleeve 16, complementary flanges 26 and 27 being provided on the sleeves 25 and 16 respectively to limit the movement of the sleeves relative to one another under the force of the spring 24.

In order to reduce friction between the sleeves 25 and 16 steel balls 28 may be interposed between the flanges 26 and 27 as shown. Under normal conditions the spring 24 will draw the annular member 17 toward the bushing 14 and hence the lugs 21 and 22 into lateral registration therefor retaining the member 17 against rotation.

A cylindrical plug 29 slidably mounted in bores 31 and 32 in the member 17 and sleeve 16 respectively serves as a medium of interconnection between the threads of the feed screw 9 and the relatively stationary assembly of the feed screw mechanism. The innermost end of the plug 29 is formed with screw threads corresponding to the threads of the screw 9 which are maintained in engagement, at will, with the screw 9 against the force of a band spring 33 by the manipulation of an eccentric cam sleeve 34. In Fig. 2 the sleeve 34 is shown in the position required to cause the plug 29 to engage with the screw. Rotation of the sleeve 180° about the axis of the screw will permit the plug 29 to be withdrawn from engagement of the feed screw under the force of the band spring 33. A lock nut 35 located upon the externally threaded and rearward end 36 of the sleeve 16 provides the dual function of lateral support for the annular member 17 and confinement of the eccentric cam sleeve 34.

With the feed screw mechanism thus described rotation of the feed screw 9, as by torque applied manually through the hand grip 11 will cause the piston 8 to advance along the longitudinal axis of the cartridge thus to place the lubricant in the cartridge under pressure sufficiently to charge the high pressure pump unit 4. If, however, the operator should, through inadvertence or by intention, turn the feed screw sufficiently tight to produce pressure within the cartridge approaching that previously determined by the characteristics of the spring 24 as dangerous to the cartridge structure, the spring 24 will yield and piston movement will cease upon the rearward movement of the sleeve 16 relative to the feed screw upon the disengagement of the lugs 21 and 22 on the members 17 and 14 respectively. Continued rotation of the feed screw will fail to increase thrust upon the piston 8 until such time as the pressure within the cartridge 5 acting upon the piston and hence upon the feed screw has been relieved to an amount sufficient to permit the lugs 21 and 22 to again engage with one another as indicated in Fig. 2.

The purpose of the eccentric cam member 34 or quick release mechanism, as it is sometimes called, is to permit the operator to withdraw the feed screw 9 from engagement with the piston and from within the cartridge by rectangular movement of the screw as when it is desired to change the cartridge for a fresh cartridge or for one having another grade of lubricant. This mechanism is described and claimed in my aforesaid copending application Serial No. 753,663.

It is to be understood that the above described embodiments of the invention are for the purpose of illustration only, and that various changes may be made therein without departing from the spirit and scope of the invention.

I claim:

1. In a lubricating device, a thrust producing means comprising, a tubular member mounted for rotational movement about its longitudinal axis, a threaded member carried by said tubular member, a screw extending through said tubular member, means for moving said threaded member into engagement with the screw whereby the screw will advance along said axis upon rotational movement relative to said tubular member, and yielding means normally retaining said tubular member against rotation.

2. In a lubricating device, a thrust producing means comprising, a tubular member mounted for rotational movement about its longitudinal axis, a threaded member carried by said tubular member, a screw extending through said tubular member, means for moving said threaded member into engagement with the screw whereby the screw will advance along said axis upon rotational movement relative to said tubular member, and yielding means normally retaining said tubular member against rotation, said means being adapted to yield under a predetermined counter-thrust applied to said screw along the axis thereof to permit rotation of said tubular member with said screw.

3. In a lubricating device, means providing a source of lubricant supply, including a piston, adapted to deliver lubricant under pressure upon the movement of said piston, a screw for moving said piston, and means responsive to a predetermined lubricant pressure in said supply means for rendering said screw ineffective to move said piston.

4. In a lubricating device, means providing a source of lubricant supply, including a piston, adapted to deliver lubricant under pressure upon the movement of said piston, means including a screw and a normally closed clutch for moving said piston, and means responsive to a predetermined lubricant pressure in said supply means for opening said clutch to render said screw ineffective to move said piston.

5. In a lubricating device, means providing a source of lubricant supply, including a piston, adapted to deliver lubricant under pressure upon movement of said piston, an internally threaded tubular member mounted for rotational movement about the axis of said piston, a manually operable screw engageable with the threads of said tubular member, for moving said piston, means normally retaining said tubular member against rotation and means responsive to a predetermined lubricant pressure in said supply source for rendering said retaining means ineffective.

6. In a lubricating device, a thrust producing means comprising, an internally threaded tubular member mounted for rotational and limited longitudinal movement about and along its longitudinal axis, a screw extending through and engageable with the internally threaded portion of said tubular member adapted to advance along said axis upon rotational movement relative to said tubular member, and yielding means urging said tubular member in the direction of thrust applied by said screw to the forward limit of its travel and means operable when said tubular member is in said last named position for retaining the tubular member against rotation.

7. In a lubricating device, means providing a source of lubricant supply, including a piston, adapted to deliver lubricant under pressure upon movement of said piston in one direction, an internally threaded tubular member mounted for rotational and limited longitudinal movement about and along the axis of said piston, clutch means for retaining said tubular member against rotation when at the limit of its longitudinal movement in the direction of said piston, yielding means for urging said tubular member to said limit of its movement, and a manually operable screw engageable with the threads of said tubular member for moving said piston when said screw is rotated relative to said tubular member.

8. In a lubricating device, a thrust producing means comprising, an elongated movable member, means for moving said member lengthwise along a fixed axis, and a clutch including relatively movable parts, one of said parts being connected to said last named means and movable in response to a predetermined counterthrust on said member to disengage the clutch thereby to render said moving means ineffective.

9. A lubricant dispensing device for use with an interchangeable lubricant cartridge comprising, a housing to receive a cartridge, a feed member carried by the housing and engageable with the cartridge to place lubricant therein under pressure, means carried by the housing for engaging the feed member to facilitate movement thereof, and means carried by the housing and responsive to the pressure of lubricant in the cartridge to render said means inoperative.

10. A lubricant dispensing device for use with an interchangeable lubricant cartridge comprising, a housing to receive a cartridge, a feed screw extending into the housing and engageable with the cartridge to place the contents thereof under pressure, a threaded member carried by the housing and engaging the feed screw, and means for holding said threaded member against rotation, said means being releasable in response to a predetermined back pressure on the feed screw.

11. A lubricant dispensing device for use with an interchangeable lubricant cartridge comprising, a housing to receive a cartridge, a feed screw extending into the housing and engageable with the cartridge to place the contents thereof under pressure, a threaded member slidably mounted in the housing and threadedly engaging the feed screw, clutch means on said member and the housing to hold the member against rotation relative to the housing, resilient means urging the member into clutch engaging position and yieldable in response to a predetermined back pressure on the feed screw to permit the member to move into clutch disengaging position.

12. A lubricant dispensing device comprising a lubricant cartridge having an outlet, means for displacing lubricant from the cartridge through said outlet, a feed member carried by the device to operate said means, mechanism including a clutch carried by the device and engaging said feed member to facilitate movement thereof, and means responsive to a predetermined back pressure on the feed member for disengaging the clutch thereby to prevent the building up of excessive pressure on the cartridge.

13. A lubricant dispensing device for use with an interchangeable lubricant cartridge comprising a housing to receive a cartridge, a feed member carried by the housing and engageable with the cartridge to place lubricant therein under pressure, means carried by the housing for engaging the feed member to facilitate movement thereof, said means including a clutch, and means responsive to pressure of lubricant in the cartridge to disengage said clutch.

HARRY R. TEAR.